(12) United States Patent
Du et al.

(10) Patent No.: US 11,399,067 B2
(45) Date of Patent: Jul. 26, 2022

(54) NETWORK ACCESS METHOD AND APPARATUS FOR SPEECH RECOGNITION SERVICE BASED ON ARTIFICIAL INTELLIGENCE

(71) Applicant: BAIDU ONLINE NETWORK TECHNOLOGY (BEIJING) CO., LTD., Beijing (CN)

(72) Inventors: Niandong Du, Beijing (CN); Yan Xie, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 394 days.

(21) Appl. No.: 15/882,553

(22) Filed: Jan. 29, 2018

(65) Prior Publication Data

US 2018/0278695 A1  Sep. 27, 2018

(30) Foreign Application Priority Data

Mar. 24, 2017  (CN) .......................... 201710186533.7

(51) Int. Cl.
*H04L 67/141* (2022.01)
*H04W 12/06* (2021.01)
(Continued)

(52) U.S. Cl.
CPC .......... *H04L 67/141* (2013.01); *G10L 15/083* (2013.01); *G10L 15/30* (2013.01);
(Continued)

(58) Field of Classification Search
CPC ..... H04L 69/22; H04L 69/329; H04L 67/141; H04L 67/2842; H04L 63/0876;
(Continued)

(56) References Cited

U.S. PATENT DOCUMENTS 7,093,018 B1 *  8/2006  Sievers .................. H04L 67/14
709/227
10,255,445 B1 *  4/2019  Brinskelle ............. H04L 63/101
(Continued)

FOREIGN PATENT DOCUMENTS

CN     102427465 A  *  4/2012  ............. G06F 9/468
CN     102567321 A  *  7/2012  ............. G06F 9/468
(Continued)

OTHER PUBLICATIONS

Server Authentication During SSL Handshake (Sun Directory Server Enterprise Edition 7.0 Reference) (Year: 2010).*
(Continued)

*Primary Examiner* — David R Lazaro
*Assistant Examiner* — Robert A Shaw
(74) *Attorney, Agent, or Firm* — Hodgson Russ LLP

(57) ABSTRACT

The present disclosure discloses a network access method and a network access apparatus for speech recognition service based on artificial intelligence. The network access method includes: judging whether there is available IP address information in an IP buffer module when a speech recognition request is received, in which the IP buffer module is configured to buffer IP address information used for a speech recognition performed successfully last time; performing an identity authentication on the available IP address information when there is the available IP address information in the IP buffer module; and accessing to the speech recognition service via the available IP address information passing the identity authentication, in which the speech recognition service is configured to recognize a speech in the speech recognition request.

15 Claims, 2 Drawing Sheets

(51) Int. Cl.
    *H04L 69/22*          (2022.01)
    *G10L 15/30*          (2013.01)
    *G10L 15/08*          (2006.01)
    *H04L 9/40*           (2022.01)
    *H04L 61/4511*       (2022.01)
    *H04L 69/329*        (2022.01)
    *G10L 15/28*          (2013.01)
    *H04L 61/58*          (2022.01)

(52) U.S. Cl.
    CPC ...... *H04L 61/4511* (2022.05); *H04L 63/0876* (2013.01); *H04L 69/22* (2013.01); *H04W 12/06* (2013.01); *G10L 15/28* (2013.01); *H04L 61/58* (2022.05); *H04L 63/168* (2013.01); *H04L 69/329* (2013.01)

(58) Field of Classification Search
    CPC ............... H04L 63/168; H04L 61/1511; H04L 61/6009; H04W 12/06; G10L 15/30; G10L 15/083; G10L 15/28
    See application file for complete search history.

(56) References Cited

U.S. PATENT DOCUMENTS

| | | | | |
|---|---|---|---|---|
| 2003/0174679 | A1* | 9/2003 | Viola | H04W 76/12 370/349 |
| 2004/0162731 | A1* | 8/2004 | Yamada | G10L 15/26 704/270.1 |
| 2005/0086340 | A1* | 4/2005 | Kang | H04L 61/4541 709/224 |
| 2006/0100881 | A1* | 5/2006 | He | G10L 15/22 704/270 |
| 2009/0077383 | A1* | 3/2009 | de Monseignat | H04L 9/3242 713/176 |
| 2010/0125675 | A1* | 5/2010 | Richardson | H04L 29/12066 709/242 |
| 2011/0153807 | A1* | 6/2011 | Vicisano | H04L 29/12066 709/224 |
| 2013/0311180 | A1* | 11/2013 | Arnison | G06F 3/16 704/235 |
| 2013/0318143 | A1* | 11/2013 | Li | H04L 67/02 709/201 |
| 2014/0189808 | A1* | 7/2014 | Mahaffey | H04L 63/083 726/4 |
| 2014/0281032 | A1* | 9/2014 | Roskind | H04L 61/1511 709/245 |
| 2015/0229651 | A1* | 8/2015 | Nicodemus | G06F 11/3495 726/1 |
| 2016/0150004 | A1* | 5/2016 | Hentunen | H04L 67/1036 726/23 |
| 2016/0165435 | A1* | 6/2016 | Mu | H04W 12/06 713/169 |
| 2016/0232374 | A1* | 8/2016 | Huang | G06F 9/468 |
| 2017/0316781 | A1* | 11/2017 | Chen | H04L 29/08 |
| 2017/0374017 | A1* | 12/2017 | Gautam | H04L 67/2804 |

FOREIGN PATENT DOCUMENTS

| | | | | |
|---|---|---|---|---|
| CN | 103227907 | | 7/2013 | |
| CN | 104168269 | | 11/2014 | |
| CN | 104168269 A | * | 11/2014 | |
| CN | 104506664 | | 4/2015 | |
| CN | 104506664 A | * | 4/2015 | |
| CN | 102427465 B | * | 5/2015 | ............. G06F 9/468 |
| CN | 104935683 A | * | 9/2015 | |
| CN | 105469788 A | * | 4/2016 | |
| EP | 2179532 B1 | * | 7/2019 | ......... H04L 63/0823 |

OTHER PUBLICATIONS

SIPO, First Office Action for CN Application No. 201710186533.7, dated Sep. 20, 2019.

* cited by examiner

NETWORK ACCESS METHOD AND APPARATUS FOR SPEECH RECOGNITION SERVICE BASED ON ARTIFICIAL INTELLIGENCE

CROSS-REFERENCE TO RELATED APPLICATION

This application claims priority to and benefits of Chinese Patent Application Serial No. 201710186533.7, filed with the State Intellectual Property Office of P. R. China on Mar. 24, 2017, the entire content of which is incorporated herein by reference.

FIELD

The present disclosure relates to a field of mobile internet technology, and more particularly to a network access method and a network access apparatus for speech recognition service based on artificial intelligence.

BACKGROUND

Artificial intelligence (AI for short) is a new technology for studying and developing theories, methods, technologies and application systems for simulating, extending and expanding human intelligence. AI is a branch of computer technology, intending to know essence of intelligence and to produce an intelligent machine acting in a way similar to human intelligence. Researches on the AI field include robots, speech recognition, image recognition, natural language processing and expert system etc.

With the rapid development of the mobile internet, users pay more attention to the speech recognition technology, and the number of products simultaneously accessing to speech recognition has been increased. A success rate and a stability of the speech recognition service became significant indexes. In a context of domestic internet, although the speech recognition service itself is stable and reliable, access of a variety of small operators and attacks by malicious threats may cause the speech recognition service to be unavailable.

At present, in the speech recognition service, a network access is totally dependent on a parsing result of a Local DNS (Domain Name Server). Once the DNS goes wrong, it may generally cause the speech recognition service to be unavailable. Problems of DNS may include: long DNS parsing time, domain name hijacking, domain name pollution and the like. The long DNS parsing time may cause a phenomenon that the speech recognition service becomes slow, and the domain name hijacking and the domain name pollution may cause the speech recognition service to be unavailable directly. Thus, how to ensure a high success rate of the speech recognition service has become a problem to be settled urgently.

SUMMARY

Embodiments of the present disclosure seek to solve at least one of the problems existing in the related art to at least some extent.

Accordingly, a first objective of the present disclosure is to provide a network access method for speech recognition service based on artificial intelligence. The network access method may ensure that the speech recognition service can be accessed in a network, such that an availability of the speech recognition service may be ensured and a success rate of the speech recognition service may be improved.

A second objective of the present disclosure is to provide a network access apparatus for speech recognition service based on artificial intelligence.

A third objective of the present disclosure is to provide a mobile terminal.

A fourth objective of the present disclosure is to provide a non-transitory computer readable storage medium.

A fifth objective of the present disclosure is to provide a computer program product.

In order to achieve the above objectives, embodiments of a first aspect of the present disclosure provide a network access method for speech recognition service based on artificial intelligence. The network access method includes: judging whether there is available IP address information in an IP buffer module when a speech recognition request is received, in which the IP buffer module is configured to buffer IP address information used for a speech recognition performed successfully last time; performing an identity authentication on the available IP address information when there is the available IP address information in the IP buffer module; and accessing to the speech recognition service via the available IP address information passing the identity authentication, in which the speech recognition service is configured to recognize a speech in the speech recognition request.

In order to achieve the above objectives, embodiments of a second aspect of the present disclosure provide a network access apparatus for speech recognition service based on artificial intelligence. The network access apparatus includes: an IP buffer module, configured to buffer IP address information used for a speech recognition performed successfully last time; a judging module, configured to judge whether there is available IP address information in the IP buffer module when a speech recognition request is received; an identity authentication module, configured to perform an identity authentication on the available IP address information when there is the available IP address information in the IP buffer module; a network accessing module, configured to access to the speech recognition service via the available IP address information passing the identity authentication, in which the speech recognition service is configured to recognize a speech in the speech recognition request.

In order to achieve the above objectives, embodiments of a third aspect of the present disclosure provide a mobile terminal, including: a housing, a processor; a memory, a circuit board and a power circuit, in which the circuit board is placed inside of a space defined by the housing, the processor and the memory are disposed on the circuit board; the power circuit is configured to supply power for circuits and elements in the mobile terminal; the memory is configured to store executable program code; and the processor is configured to perform the program corresponding to the executable program code by reading the executable program code stored in the memory, so as to execute following acts: judging whether there is available IP address information in an IP buffer module when a speech recognition request is received, in which the IP buffer module is configured to buffer IP address information used for a speech recognition performed successfully last time; performing an identity authentication on the available IP address information when there is the available IP address information in the IP buffer module; and accessing to the speech recognition service via the available IP address information passing the identity authentication, in which the speech recognition service is configured to recognize a speech in the speech recognition request.

In order to achieve the above objectives, embodiments of a fourth aspect of the present disclosure provide a non-transitory computer readable storage medium, when instructions stored in the non-transitory computer readable storage medium are executed by a processor in a mobile terminal, the mobile terminal is caused to execute a network access method for speech recognition service based on artificial intelligence. The network access method includes: judging whether there is available IP address information in an IP buffer module when a speech recognition request is received, in which the IP buffer module is configured to buffer IP address information used for a speech recognition performed successfully last time; performing an identity authentication on the available IP address information when there is the available IP address information in the IP buffer module; and accessing to the speech recognition service via the available IP address information passing the identity authentication, in which the speech recognition service is configured to recognize a speech in the speech recognition request.

In order to achieve the above objectives, embodiments of a fifth aspect of the present disclosure provide a computer program product, when instructions in the computer program product are executed by a processor, a network access method for speech recognition service based on artificial intelligence is executed. The network access method includes: judging whether there is available IP address information in an IP buffer module when a speech recognition request is received, in which the IP buffer module is configured to buffer IP address information used for a speech recognition performed successfully last time; performing an identity authentication on the available IP address information when there is the available IP address information in the IP buffer module; and accessing to the speech recognition service via the available IP address information passing the identity authentication, in which the speech recognition service is configured to recognize a speech in the speech recognition request.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

Above and/or additional aspects and advantages of embodiments of the present disclosure will become apparent and more readily appreciated from the following descriptions made with reference to the drawings, in which.

DETAILED DESCRIPTION

Figure 1:
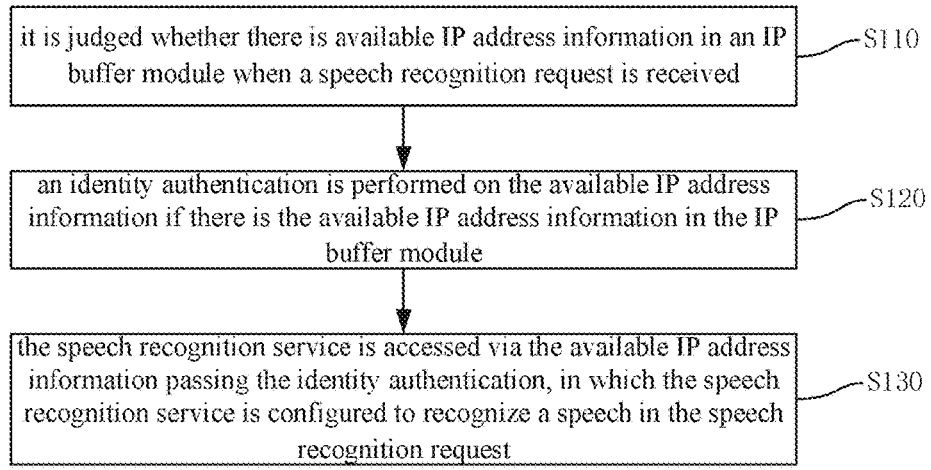
FIG. 1 is a flow chart of a network access method for speech recognition service based on artificial intelligence according to an embodiment of the present disclosure.

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In mobile internet, there might be domain name parsing problems when all kinds of mobile products send data requests to a server. Once a domain name parsing process goes wrong, most products fail to work normally. For example, if there is a problem of the domain name, it may cause the speech recognition service to be unavailable. In some products requiring keep-alive, there may be a plenty of time for the service to solve the problem of slow domain parsing. However, in speech recognition service, a network access is totally dependent on Local DNS service, which means that the speech recognition service may be unavailable if this part of service fails to work normally.

Such problems may be caused by domain name hijacking, domain name pollution, long DNS parsing time and the like. In this case, the speech recognition service itself may be normal and stable, but the user suffering from the above problems cannot use the speech recognition service normally. In order to solve such problems, to ensure an availability of the speech recognition service in various poor network conditions, and to ensure a success rate of the speech recognition service, the present disclosure provides a network access method and a network access apparatus for speech recognition service based on artificial intelligence. The present disclosure is mainly considered and designed for a network access layer in the speech recognition service, so as to ensure that the user can perform the speech recognition operations normally. Specifically, the network access method and the network access apparatus for speech recognition service based on artificial intelligence will be described as follows with reference to the drawings.

FIG. 1 is a flow chart of a network access method for speech recognition service based on artificial intelligence according to an embodiment of the present disclosure. It should be noted that the network access method for speech recognition service based on artificial intelligence according to an embodiment of the present disclosure may be applied to a network access apparatus for speech recognition service based on artificial intelligence according to an embodiment of the present disclosure, and the network access apparatus may be configured in a mobile terminal. The mobile terminal may be a hardware device with various operation systems, such as a mobile phone, a tablet computer, a personal digital assistant and the like.

As shown in FIG. 1, the network access method includes following acts.

In act S110, it is judged whether there is available IP address information in an IP buffer module when a speech recognition request is received, in which the IP buffer module is configured to buffer IP address information used for a speech recognition performed successfully last time.

For example, it is assumed that the network access method according to embodiments of the present disclosure may be applied in a mobile terminal. The mobile terminal may provide a user an application with a speech recognition function, receive speech information input by the user via the application and perform a speech recognition on the speech information. The speech recognition service may be accessed in a network before the speech recognition is performed on the speech information, i.e., a domain name parsing may be performed for the speech recognition. In this act, when the speech recognition request is received, i.e., when the speech recognition starts, it may be searched in the IP buffer module whether there is available IP address information.

It should be noted that, in the embodiments of the present disclosure, the IP buffer module may record IP address information, a timestamp and a network access manner used for the speech recognition performed successfully last time. The timestamp may be understood as a time when the speech recognition is performed successfully last time. The network access manner may include a WiFi (Wireless Fidelity) network, a mobile data network etc. The mobile data network may include but is not limited to 2G/3G/4G network, or mobile network operators, or Unicom network operators, or telecom network operators.

As an example, a condition for judging whether there is the available IP address information may include: whether a time period between a timestamp of IP address information buffered by the IP buffer module and a current time is less than or equal to a preset threshold, and whether the network access manner for the speech recognition service corresponding to the buffered IP address information is same as that of a current speech recognition service.

In some embodiments, when the speech recognition request is received, it may be searched in the IP buffer module whether there is available IP address information. If the time period between the timestamp of the IP address information recorded in the IP buffer module and a current time is less than or equal to a preset threshold (for example, five minutes), meanwhile, the network access manner of the previous speech recognition service is same as that of the current speech recognition service, it may be determined that there is available IP address information in the IP buffer module. Otherwise, it may be determined that there is no available IP address information in the IP buffer module.

In act S120, an identity authentication is performed on the available IP address information if there is the available IP address information in the IP buffer module.

In an embodiment of the preset disclosure, an HTTPS protocol is used in a network communication for the speech recognition service for interacting, and the identity authentication may be performed on the available IP address information based on the HTTPS protocol.

In other words, if the available IP address information is searched in the IP buffer module, the available IP address information may be acquired and an identity authentication may be performed thereon based on the HTTPS protocol, so as to authenticate whether the available IP address information is an IP address of the speech recognition service itself. It may be understood that the authentication may be successful only when the available IP address information is an IP address of the speech recognition service itself.

Therefore, data security in the speech recognition process may be ensured by the network communication based on the HTTPS protocol. The identity authentication may be performed before recognizing speech data. The speech recognition process may be safer by adding one authentication process, thereby ensuring security and privacy of data and preventing capturing and intercepting by malicious users.

In act S130, the speech recognition service is accessed via the available IP address information passing the identity authentication, in which the speech recognition service is configured to recognize a speech in the speech recognition request.

In some embodiment, when the available IP address information passes the identity authentication, the speech recognition process may be initiated by the available IP address information, i.e., the speech recognition service may access in a network via the available IP address information. Thus, by means of the speech recognition service corresponding to the available IP address information, the speech recognition may be performed on the speech data in the speech recognition request.

With the network access method according to embodiments of the present disclosure, when the speech recognition request is received, it may be judged whether there is available IP address information in an IP buffer module, and if yes, the identity authentication may be performed on the available IP address information, and the speech recognition service is accessed via the available IP address information passing the identity authentication, in which the speech recognition service is configured to recognize a speech in the speech recognition request. In other words, the IP buffer module may buffer IP address information used for a speech recognition performed successfully last time, such that multiple DNS parsing operations may be avoided in a continuous speech recognition process, thereby solving the problem of slow DNS parsing. By acquiring the available IP address information from the IP buffer module, it may be ensured that the speech recognition service can be accessed in a network rapidly, thereby ensuring an availability of the speech recognition service and improving a success rate of the speech recognition service.

Figure 2:
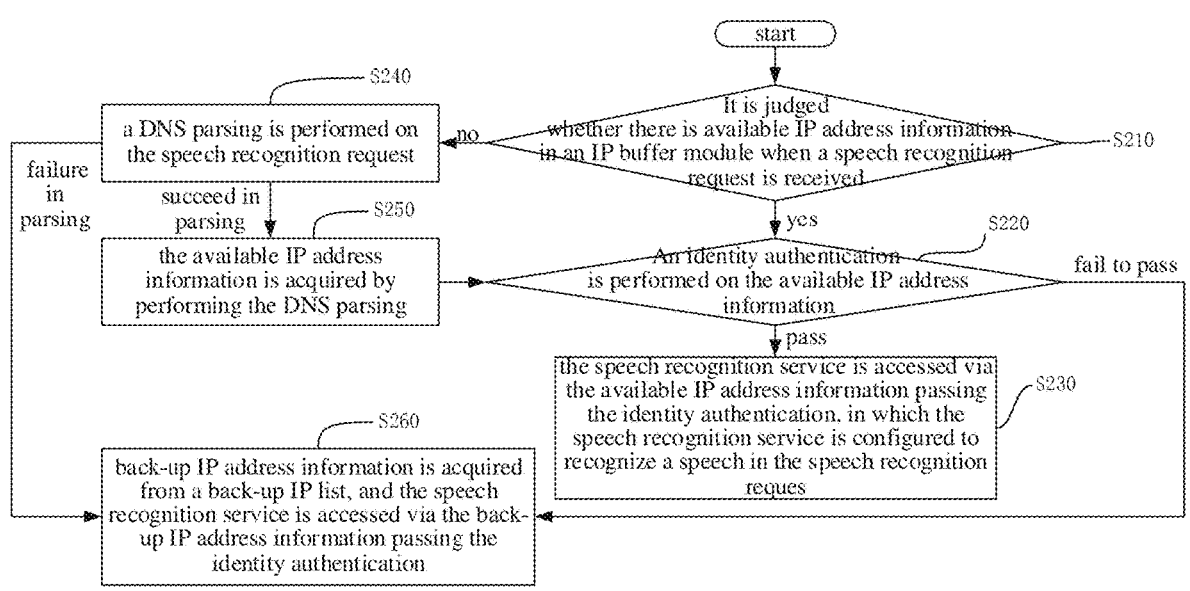
FIG. 2 is a flow chart of a network access method for speech recognition service based on artificial intelligence according to a specific embodiment of the present disclosure.

FIG. 2 is a flow chart of a network access method for speech recognition service based on artificial intelligence according to a specific embodiment of the present disclosure.

In order to further improve the availability and feasibility of the present disclosure, in embodiments of the present disclosure, if the identity authentication performed on the available IP address information is failed, or if the DNS parsing performed on the speech recognition request is failed, back-up IP address information may be acquired from a back-up IP list, such that the speech recognition service may be accessed via the back-up IP address information. Specifically, as shown in FIG. 2, the network access method may include following acts.

In act S210, it is judged whether there is available IP address information in an IP buffer module when a speech recognition request is received, in which the IP buffer module is configured to buffer IP address information used for a speech recognition performed successfully last time.

As an example, a condition for judging whether there is the available IP address information may include: whether a time period between a timestamp of IP address information buffered by the IP buffer module and a current time is less than or equal to a preset threshold, meanwhile, whether the network access manner for the speech recognition service corresponding to the buffered IP address information is same as that of a current speech recognition service.

In act S220, an identity authentication is performed on the available IP address information if there is the available IP address information in the IP buffer module.

In an embodiment of the present disclosure, the HTTPS protocol is used in a network communication for the speech recognition service for interacting, and the identity authentication may be performed on the available IP address information based on the HTTPS protocol.

In act S230, the speech recognition service is accessed via the available IP address information passing the identity authentication, in which the speech recognition service is configured to recognize a speech in the speech recognition request.

In act S240, a DNS parsing is performed on the speech recognition request if there is no available IP address information in the IP buffer module.

In detail, if no available IP address information is found in the IP buffer module, the local DNA parsing can be directly performed on the speech recognition request.

In act S250, the identity authentication is performed on the available IP address information acquired by performing the DNS parsing on the speech recognition request.

In other words, when a DNS parsing is performed on the speech recognition request, if an IP address information may be acquired by DNS parsing, the parsed IP address information may be regarded as the available IP address information, and the act S220 may be executed, i.e., performing the identity authentication on the available IP address information.

In act S260, back-up IP address information is acquired from a back-up IP list if the DNS parsing is failed.

In other words, when DNS parsing is performed on the speech recognition request, if the DNS parsing is overtime or failed, back-up IP address information may be randomly acquired from a back-up IP list. In embodiments of the present disclosure, when the back-up IP address information is acquired, the identity authentication based on the HTTPS protocol may be performed on the back-up IP address information, and the speech recognition service is accessed via the back-up IP address information passing the identity authentication.

It may be understood that, in the embodiments of the present disclosure, if the back-up IP address information fails to pass the identity authentication, other back-up IP address information may be selected from the back-up IP list, such that the speech recognition service is accessed via other back-up IP address information.

It should be noted that, in an embodiment of the present disclosure, the back-up IP list may include a plurality of pieces of back-up IP address information. The back-up IP address information may be pre-stored into the back-up IP list, and the plurality of pieces of back-up IP addresses are fixed IP addresses for speech recognition service which will not be changed. Moreover, the plurality of back-up IP addresses are BGP (Border Gateway Protocol) IPs, and thus the speech recognition service may be accessed rapidly regardless of which network operator is used by a mobile terminal.

Alternatively, in the embodiments of the present disclosure, back-up IP address information may be acquired from a back-up IP list if the available IP address information fails to pass the identity authentication. When the back-up IP address information passes the identity authentication, in which the speech recognition service is accessed via the back-up IP address information. In other words, if the available IP address information fails to pass the identity authentication, back-up IP address information may be selected from the back-up IP list randomly, and the identity authentication based on the HTTPS protocol may be performed on the back-up IP address information. If the back-up IP address information passes the identity authentication, the speech recognition service is accessed via the back-up IP address information. Therefore, the back-up IP list may work in a case of a failed DNS parsing and a domain name hijacking (such as a case that the identity authentication is failed). When such problems occur, it may be switched quickly to using the back-up IP address, and thus ensuring the availability of the speech recognition service and improving the success rate of the speech recognition service.

In order to improve the availability and feasibility of the present disclosure, further, in an embodiment of the present disclosure, after the speech recognition service recognizes the speech in the speech recognition request, the network access method may include: updating the IP address information of a current speech recognition service into the IP buffer module.

In some embodiments, after the speech recognition service accurately recognizes the speech data in the speech recognition request, the IP address information of the current speech recognition service may be updated into the IP buffer module, such that IP buffered in the IP buffer module may be updated continually, thereby ensuring that IP addresses recorded in the IP buffer module are available IPs and providing a convenience for accessing to the speech recognition service.

With the network access method according to embodiments of the present disclosure, back-up IP address information may be acquired from a back-up IP list if the available IP address information fails to pass the identity authentication, or if the DNS parsing for the speech recognition request is failed, such that the speech recognition service is accessed via the back-up IP address information. In other words, the back-up IP list may work in a case of a failed DNS parsing and a domain name hijacking (such as a case that the identity authentication is failed). When such problems occur, it may be switched quickly to use the back-up IP address, and thus ensuring the availability of the speech recognition service and improving the success rate of the speech recognition service.

Figure 3:
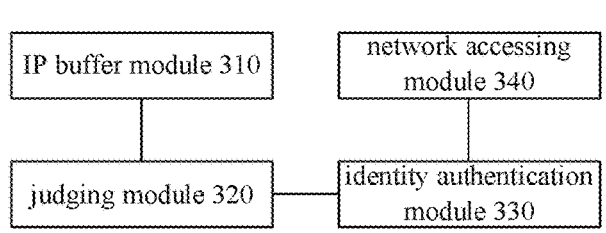
FIG. 3 is a block diagram of a network access apparatus for speech recognition service based on artificial intelligence according to an embodiment of the present disclosure.

Corresponding to the network access method for speech recognition service based on artificial intelligence provided by the above embodiments, an embodiment of the present disclosure further provides a network access apparatus for speech recognition service based on artificial intelligence. Since the network access apparatus provided by embodiments of the present disclosure corresponds to the network access method provided by the above embodiments, implementations of the network access method mentioned above are suitable for the network access apparatus provided by this embodiment, which will not be described in detail in this embodiment. FIG. 3 is a block diagram of a network access apparatus for speech recognition service based on artificial intelligence according to an embodiment of the present disclosure. As shown in FIG. 3, the network access apparatus may include: an IP buffer module 310, a judging module 320, an identity authentication module 330 and a network accessing module 340.

In some embodiments, the IP buffer module 310 is configured to buffer IP address information used for a speech recognition performed successfully last time.

The judging module 320 is configured to judge whether there is available IP address information in the IP buffer module 310 when a speech recognition request is received. As an example, a condition for judging whether there is the available IP address information may include: whether a time period between a timestamp of IP address information buffered by the IP buffer module and a current time is less than or equal to a preset threshold, and whether the network access manner for the speech recognition service corresponding to the buffered IP address information is same as that of a current speech recognition service.

The identity authentication module 330 is configured to perform an identity authentication on the available IP address information when there is the available IP address information in the IP buffer module 310. As an example, an HTTPS protocol is used in a network communication for the speech recognition service for interacting, and the identity authentication may be performed by the identity authentication module 330 on the available IP address information based on the HTTPS protocol.

The network accessing module 340 is configured to access to the speech recognition service via the available IP address information passing the identity authentication, in which the speech recognition service is configured to recognize a speech in the speech recognition request.

Figure 4:
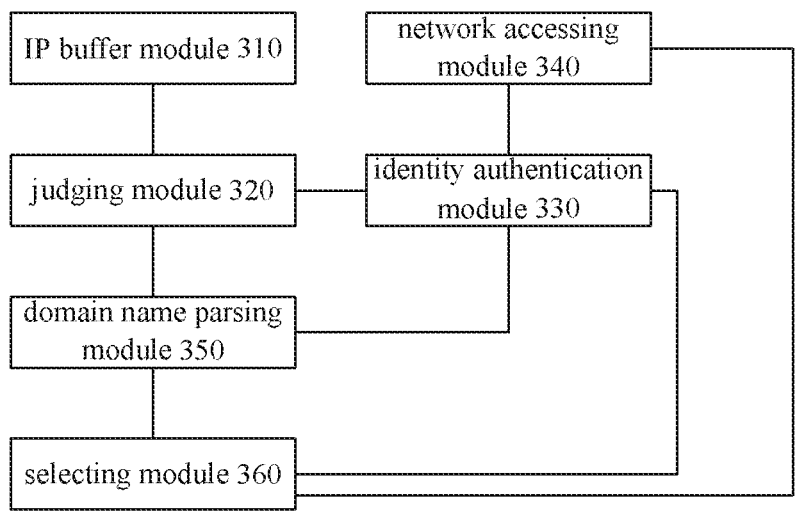
FIG. 4 is a block diagram of a network access apparatus for speech recognition service based on artificial intelligence according to a specific embodiment of the present disclosure.

In order to further improve the availability and feasibility of the present disclosure, in an embodiment of the present disclosure, as shown in FIG. 4, the network access apparatus further includes a domain name parsing module 350 and a selecting module 360. The domain name parsing module 350 is configured to perform a DNS parsing on the speech recognition request when there is no available IP address information in the IP buffer module 310. The identity authentication module 330 is further configured to perform the identity authentication on the available IP address information when the available IP address information is acquired by performing the DNS parsing on the speech recognition request. The selecting module 360 is configured to acquire back-up IP address information from a back-up IP list when the DNS parsing is failed. The network accessing module 340 is further configured to access to the speech recognition service via the back-up IP address information passing the identity authentication.

In an embodiment of the present disclosure, the selecting module 360 is further configured to acquire the back-up IP address information from the back-up IP list when the available IP address information fails to pass the identity authentication.

Figure 5:
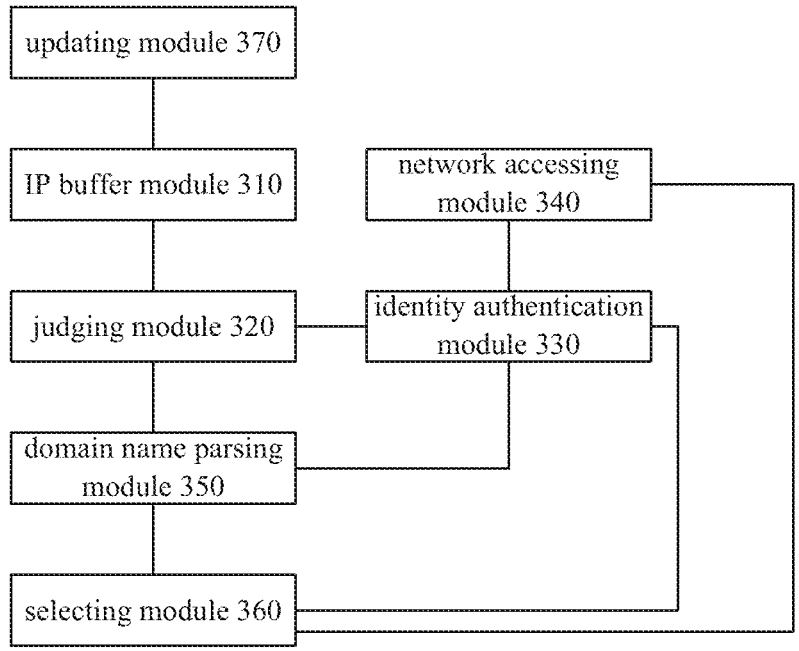
FIG. 5 is a block diagram of a network access apparatus for speech recognition service based on artificial intelligence according to another specific embodiment of the present disclosure.

In order to improve the availability and feasibility of the present disclosure, in an embodiment of the present disclosure, as shown in FIG. 5, the network access apparatus further includes: an updating module 370, configured to update IP information of a current speech recognition service into the IP buffer module after the speech recognition service recognizes the speech in the speech recognition request, thereby ensuring that IP addresses recorded in the IP buffer module are available IP and providing a convenience for accessing to the speech recognition service.

With the network access apparatus according to embodiments of the present disclosure, when the speech recognition request is received, the judging module may judge whether there is available IP address information in the IP buffer module, and if yes, the identity authentication module may perform the identity authentication on the available IP address information, and the network accessing module may access to the speech recognition service via the available IP address information passing the identity authentication, in which the speech recognition service is configured to recognize a speech in the speech recognition request. In other words, the IP buffer module may buffer IP address information used for a speech recognition performed successfully last time, such that multiple DNS parsing operations may be avoided in a continuous speech recognition process, thereby solving the problem of slow DNS parsing. By acquiring the available IP address information from the IP buffer module, it may be ensured that the speech recognition service can be accessed in a network rapidly, thereby ensuring an availability of the speech recognition service and improving a success rate of the speech recognition service.

It should be noted that that terms such as "first" and "second" are used in the description of the present disclosure for purposes of description and are not intended to indicate or imply relative importance or significance. Moreover, in the description of the present disclosure, "a plurality of" means two or more than two, such as two or three, unless specified otherwise.

In the description of the present disclosure, reference term "an embodiment," "some embodiments," "an example," "a specific example," or "some examples," means that a particular feature, structure, material, or characteristic described in connection with the embodiment or example is included in at least one embodiment or example of the present disclosure. Furthermore, the particular features, structures, materials, or characteristics may be combined in any suitable manner in one or more embodiments or examples.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable memory medium.

The above-mentioned memory medium may be a read-only memory, a magnetic disc, an optical disc, etc. Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A network access method for speech recognition service based on artificial intelligence, comprising:
    judging whether there is available IP address information in an IP buffer module when a speech recognition request is received, wherein the IP buffer module is configured to buffer IP address information used for a speech recognition performed successfully last time;
    performing an identity authentication on the available IP address information after it is judged that there is the available IP address information in the IP buffer module, wherein the identity authentication verifies that the available IP address information is an IP address of the speech recognition service; and
    accessing to the speech recognition service via the available IP address information passing the identity authentication, wherein the speech recognition service is configured to recognize a speech in the speech recognition request;
    wherein judging whether there is available IP address information in the IP buffer module comprises:
        judging whether a network access manner of the speech recognition performed successfully last time using the buffered IP address information is same as a current network access manner of the speech recognition request;
    wherein the network access manner comprises at least one of a WiFi network and a mobile data network.

2. The network access method according to claim 1, further comprising:
    performing a DNS parsing on the speech recognition request if there is no available IP address information in the IP buffer module;
    performing the identity authentication on the available IP address information acquired by performing the DNS parsing on the speech recognition request; and
    acquiring back-up IP address information from a back-up IP list when the DNS parsing is failed, wherein the speech recognition service is accessed via the back-up IP address information passing the identity authentication.

3. The network access method according to claim 1, further comprising:
    acquiring the back-up IP address information from the back-up IP list when the available IP address information fails to pass the identity authentication, wherein the speech recognition service is accessed via the back-up IP address information passing the identity authentication.

4. The network access method according to claim 1, wherein an HTTPS protocol is used in a network communication for the speech recognition service for interacting, and performing an identity authentication on the available IP address information comprises:
    performing the identity authentication on the available IP address information based on the HTTPS protocol.

5. The network access method according to claim 1, wherein after the speech recognition service recognizes the speech in the speech recognition request, the network access method comprises:
    updating IP address information of a current speech recognition service into the IP buffer module.

6. The network access method according to claim 1, wherein judging whether there is available IP address information in the IP buffer module further comprises:
    judging whether a time period between a timestamp of IP address information buffered by the IP buffer module and a current time is less than or equal to a preset threshold.

7. The network access method according to claim 2, wherein the back-up IP address information is information on a border gateway protocol IP.

8. A network access apparatus for speech recognition service based on artificial intelligence, comprising:
    one or more processors;
    a memory;
    one or more programs stored in the memory, wherein when the one or more programs are executed by the one or more processors, the one or more processors are configured to:
        buffer IP address information used for a speech recognition performed successfully last time;
        judge whether there is available IP address information in the IP buffer module when a speech recognition request is received;
        perform an identity authentication on the available IP address information after it is judged that there is the available IP address information in the IP buffer module, wherein the identity authentication verifies that the available IP address information is an IP address of the speech recognition service; and
        access to the speech recognition service via the available IP address information passing the identity authentication, wherein the speech recognition service is configured to recognize a speech in the speech recognition request;
    wherein the one or more processors are configured to judge whether there is available IP address information in the IP buffer module by:

judging whether a network access manner of the speech recognition performed successfully last time using the buffered IP address information is same as a current network access manner of the speech recognition request;

wherein the network access manner comprises at least one of a WiFi network and a mobile data network.

9. The network access apparatus according to claim 8, wherein the one or more processors are configured to:

perform a DNS parsing on the speech recognition request if there is no available IP address information in the IP buffer module;

perform the identity authentication on the available IP address information when the available IP address information is acquired by performing the DNS parsing on the speech recognition request;

acquire back-up IP address information from a back-up IP list when the DNS parsing is failed; and access to the speech recognition service via the back-up IP address information passing the identity authentication.

10. The network access apparatus according to claim 9, wherein the one or more processors are configured to:

acquire the back-up IP address information from the back-up IP list when the available IP address information fails to pass the identity authentication.

11. The network access apparatus according to claim 8, wherein an HTTPS protocol is used in a network communication for the speech recognition service for interacting, and the one or more processors are configured to:

perform the identity authentication on the available IP address information based on the HTTPS protocol.

12. The network access apparatus according to claim 8, wherein after the speech recognition service recognizes the speech in the speech recognition request, the one or more processors are configured to:

update IP address information of a current speech recognition service into the IP buffer module.

13. The network access apparatus according to claim 8, wherein the one or more processors are further configured to judge whether there is available IP address information in the IP buffer module by:

judging whether a time period between a timestamp of IP address information buffered by the IP buffer module and a current time is less than or equal to a preset threshold.

14. The network access method according to claim 9, wherein the back-up IP address information is information on a border gateway protocol IP.

15. A non-transitory computer readable storage medium, wherein when instructions stored in the non-transitory computer readable storage medium are executed by a processor in a mobile terminal, the mobile terminal is caused to execute a network access method for speech recognition service based on artificial intelligence, comprising:

judging whether there is available IP address information in an IP buffer module when a speech recognition request is received, wherein the IP buffer module is configured to buffer IP address information used for a speech recognition performed successfully last time;

performing an identity authentication on the available IP address information after it is judged that there is the available IP address information in the IP buffer module, wherein the identity authentication verifies that the available IP address information is an IP address of the speech recognition service; and accessing to the speech recognition service via the available IP address information passing the identity authentication, wherein the speech recognition service is configured to recognize a speech in the speech recognition request;

wherein judging whether there is available IP address information in the IP buffer module comprises:

judging whether a network access manner of the speech recognition performed successfully last time using the buffered IP address information is same as a current network access manner of the speech recognition request;

wherein the network access manner comprises at least one of a WiFi network and a mobile data network.

* * * * *